Figure 1:
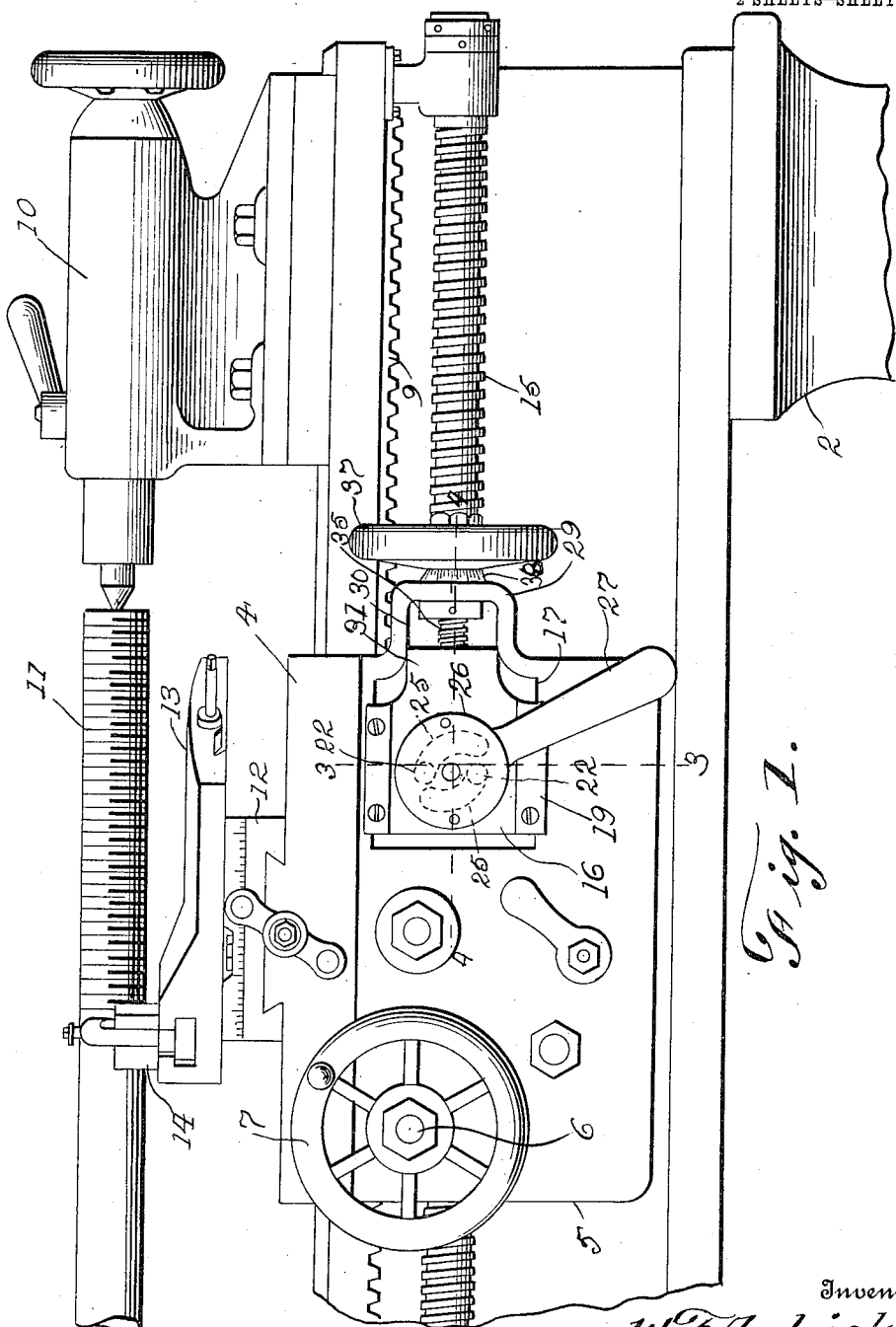

W. F. ANDRICKS.
THREAD CUTTING LATHE.
APPLICATION FILED AUG. 2, 1912.

1,064,590.

Patented June 10, 1913.

2 SHEETS—SHEET 1.

Witnesses
Francis MacNerhany
J. M. Cullman

Inventor
W. F. Andricks.
By [signature]
Attorney

W. F. ANDRICKS.
THREAD CUTTING LATHE.
APPLICATION FILED AUG. 2, 1912.
1,064,590.
Patented June 10, 1913.
2 SHEETS—SHEET 2.
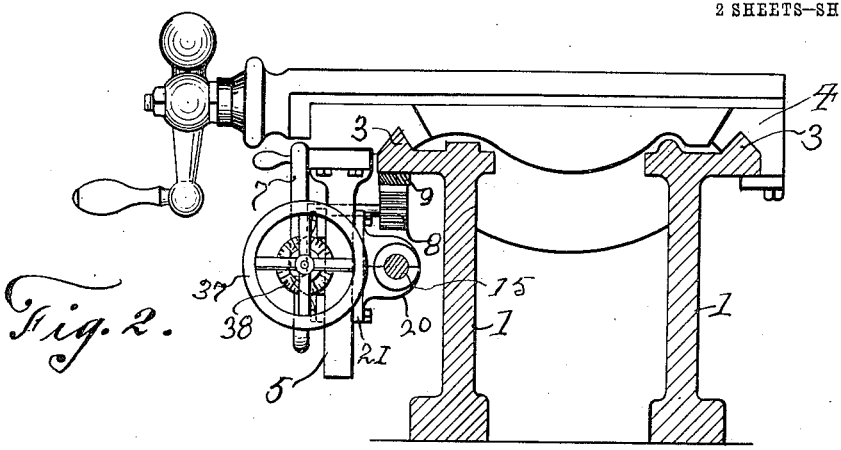
Fig. 2.
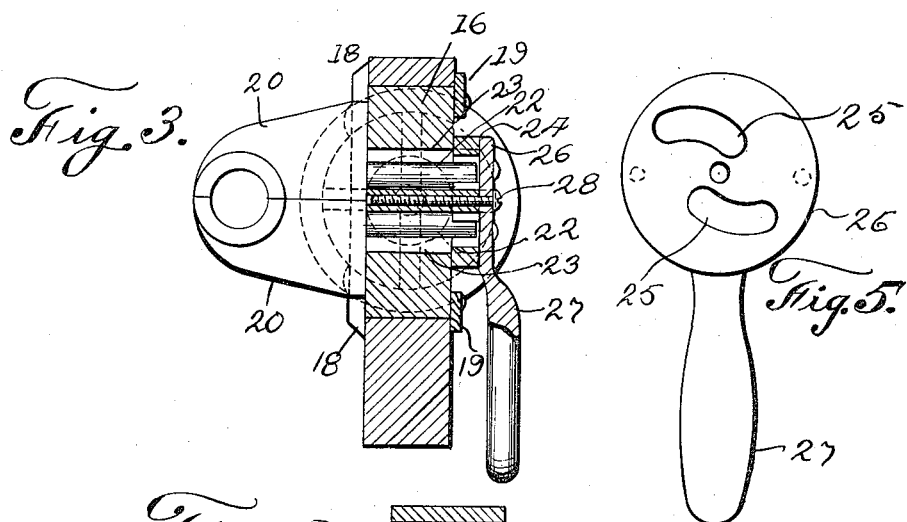
Fig. 3.
Fig. 5.
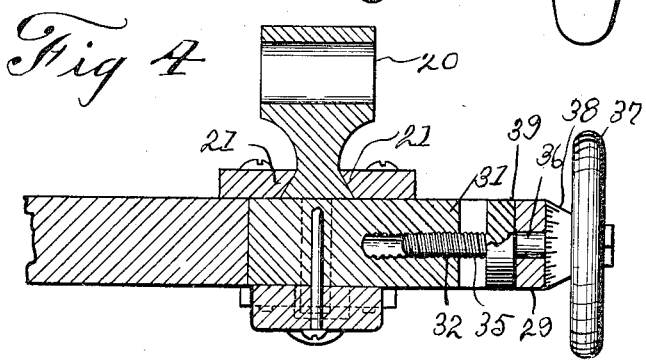
Fig. 4.
Witnesses
Francis MacNohany
L. W. Cullman
Inventor
W. F. Andricks
By V. Randolph Jr.
Attorney

UNITED STATES PATENT OFFICE.

WILLIAM F. ANDRICKS, OF BOWLING GREEN, OHIO.

THREAD-CUTTING LATHE.

1,064,590.

Specification of Letters Patent.   Patented June 10, 1913.

Application filed August 2, 1912.   Serial No. 712,937.

*To all whom it may concern:*

Be it known that I, WILLIAM F. ANDRICKS, a citizen of the United States, residing at Bowling Green, in the county of Wood and State of Ohio, have invented certain new and useful Improvements in Thread-Cutting Lathes, of which the following is a specification.

My invention relates to lathes for cutting threads and has for its object the provision of means applied to the lathe apron for moving the apron and cutting tool relatively to the lead screw so that a side cut or a center cut may be made as desired on the work to enable cutting smooth threads.

Heretofore, in operating engine or screw cutting lathes employing a lead screw, especially on tool room lathes where taps, hobs, worms, gages, etc., are manufactured, much difficulty has been experienced in catching or side cutting for finishing threads on the present style of lathes where the split nut closes on the lead screw because said split nut is rigidly secured to the lathe apron. In my improvements, a horizontal adjustment is secured independently of the apron carrying the split nut so that when starting at the end of the thread, should a side cut or center cut be desired, the split nut may be adjusted until the point of the tool is advanced or retarded, while the machine is in motion, without throwing open the split as has heretofore been necessary.

My invention will be described in detail hereinafter and illustrated in the accompanying drawings, in which, Figure 1 is a fragmental view in elevation of a lathe showing my improvements in position thereon; Fig. 2, a cross section of the lathe mounting showing the apron in end elevation; Fig. 3, a cross section of the lathe apron on the plane indicated by the line 3—3 of Fig. 1; Fig. 4, a longitudinal sectional view of the lathe apron on the plane indicated by the line 4—4 of Fig. 1, showing the feed wheel and the gage in elevation; and Fig. 5, a plan view of the cam block for adjusting the split nut.

In the drawings similar reference characters will be used to designate corresponding parts in the several views.

1 indicates the framework of the lathe mounted on any suitable support such as shown at 2 in Fig. 1, and having the V-shaped bearings 3 on which is slidably mounted a carriage 4.

5 indicates the lathe apron secured to the carriage 4. 6 indicates a feed shaft journaled in said apron and operated by a hand wheel 7, said feed shaft having a pinion 8 secured thereto that meshes with a rack 9 mounted on the frame 1.

10 indicates one of the spindle casings mounted in the usual manner on the frame 1 and 11 indicates a rod or shaft on which the machine is operating.

12 indicates a cross slide mounted in the usual manner on the carriage 4, 13 the tool rest mounted on said cross slide, and 14 the tool secured in the usual manner to said tool rest 13.

15 indicates the lead screw employed in this class of machines and usually secured to the apron by means of a split nut slidably mounted on said apron. In my improved device, however, instead of mounting the split nut on the apron itself, I provide a block 16 slidably mounted in the recess 17 in the apron 5, said block being mounted by means of flanges 18 formed integral with said block and removable plates 19 that coöperate with said flanges to hold the block in position in said recess. 20 indicates a split nut having its two portions slidably mounted in bearing members 21 secured to said block 16 and provided with pins 22 that extend through openings 23 in said block.

24 indicates a cam block rotatably mounted on block 16 and having segmental cam slots 25 therein that engage the ends of pins 22.

26 indicates a plate secured to cam block 24 and having an integral handle 27 for actuating said block, said plate 26 and cam block 24 being secured to the block 16 by means of a central screw or other suitable fastening 28.

The operation of the split nut 20 by means of the cam block 24 is the same as employed in the lathes commonly constructed and further description of this part is considered to be unnecessary.

The end of the apron 5 is provided with an offset portion 29 that is also recessed as shown at 30 in continuation of the recess 17, and the block 16 is provided with an offset portion 31 that is adapted to reciprocate within said recess 30, and is formed with a threaded opening 32 to receive a screw shaft 35 rotatably mounted in an opening 36 in the offset portion 29, said shaft having a hand wheel 37 mounted on its outer terminal and a tapered collar 38 secured adjacent to said hand wheel and provided with a micrometer dial calibrated to one one-thousandth part of an inch, as clearly shown in Figs. 1 and 4.

39 indicates a collar formed integral with screw shaft 35 and bearing against the inner side of the offset portion 29 to prevent longitudinal movement of the shaft 35 relative to said offset portion.

In operation, the lathe mechanism consisting of the lead screw 15, the rack 9 and other connecting parts, as well as the tool holding mechanism mounted on the carriage 4, are operated in the usual manner and a description thereof herein is not considered necessary. The improvements comprising my invention consist as hereinbefore stated, of mounting the split nut engaging the lead screw 15 on a block slidably mounted on the lathe apron 5, said block being adjustable by means of the screw shaft 35 operated by the hand wheel 37, so that the carriage 4 may be advanced or retarded relatively to the lead screw 15, while the lathe is in operation to regulate the threads cut on the work indicated at 11 in Fig. 1.

Having thus described my invention, what I claim is:—

In combination with a tool rest for lathes, an apron secured to said tool rest, said apron having a substantially rectangular aperture adjacent one end, one side of the rectangular aperture extending outwardly to form a U-shaped member, thereby forming a reduced aperture intermediate its arms, a block slidable in the aperture, said block provided with a reduced end adapted to extend into the aperture formed intermediate the U-shaped arms, a threaded shaft extending through the end of the U-shaped member, an internally threaded collar adapted to coöperate with the threaded shaft, and a hand wheel secured to the end of the threaded shaft and provided with an outwardly tapering collar having graduations therearound, whereby micrometer adjustment of a tool carried by the tool rest is obtained.

In testimony whereof I affix my signature in presence of two witnesses.

WILLIAM F. ANDRICKS.

Witnesses:
 EARL D. BLOOM,
 Mrs. W. F. ANDRICKS.

---

Copies of this patent may be obtained for five cents each, by addressing the "Commissioner of Patents, Washington, D. C."